(12) United States Patent
Ma et al.

(10) Patent No.: US 12,449,125 B2
(45) Date of Patent: Oct. 21, 2025

(54) HEAT EXCHANGE FLUE AND HEAT EXCHANGE DEVICE

(71) Applicants: Chengguo Ma, Shuangyashan (CN); Zihe Ma, Shuangyashan (CN)

(72) Inventors: Chengguo Ma, Shuangyashan (CN); Zihe Ma, Shuangyashan (CN)

( * ) Notice: Subject to any disclaimer, the term of this patent is extended or adjusted under 35 U.S.C. 154(b) by 857 days.

(21) Appl. No.: 17/599,005

(22) PCT Filed: Sep. 16, 2019

(86) PCT No.: PCT/CN2019/105998
§ 371 (c)(1),
(2) Date: Sep. 28, 2021

(87) PCT Pub. No.: WO2020/192035
PCT Pub. Date: Oct. 1, 2020

(65) Prior Publication Data
US 2022/0178536 A1 Jun. 9, 2022

(30) Foreign Application Priority Data
Mar. 28, 2019 (CN) .......................... 201910263998.7

(51) Int. Cl.
*F23J 13/02* (2006.01)
*F23J 13/08* (2006.01)
*F23J 15/06* (2006.01)

(52) U.S. Cl.
CPC ............... *F23J 13/02* (2013.01); *F23J 13/08* (2013.01); *F23J 15/06* (2013.01)

(58) Field of Classification Search
USPC ........................................................ 237/81
See application file for complete search history.

(56) References Cited

U.S. PATENT DOCUMENTS 2,716,021 A * 8/1955 Evans .................... F23L 13/00
165/95
4,033,320 A * 7/1977 Jury ....................... F24H 3/087
126/110 R
(Continued)

FOREIGN PATENT DOCUMENTS

CN 104344413 A 2/2015
CN 105546562 A 5/2016
(Continued)

OTHER PUBLICATIONS

The Extended European Search Report, Application No. 19921587. 2, dated Nov. 24, 2022.
(Continued)

*Primary Examiner* — Steven B Mcallister
*Assistant Examiner* — John E Bargero
(74) *Attorney, Agent, or Firm* — MacMillan, Sobanski & Todd, LLC

(57) ABSTRACT

A heat exchange flue has a top flue gas chamber, a bottom flue gas chamber, and a heat exchange section located therebetween that includes a heat exchange tube bundle located in the middle and a left side flue and a right side flue located at two sides of the heat exchange tube bundle. The axis of the heat exchange tube bundle is positioned in a vertical plane extending substantially forward and backward, allowing the flue gas to laterally flush against the surfaces of heat exchange tubes. The left and right side flues are in a vertical box shape, and the flues are each provided with a plurality of flue gas dampers (3). Each of the flue gas dampers is provided with a flue gas damper frame for defining a flue gas port and a flue gas port opening/closing device capable of selectively opening and closing the flue gas port.

14 Claims, 7 Drawing Sheets

(56) References Cited

U.S. PATENT DOCUMENTS

| | | | | |
|---|---|---|---|---|
| 4,207,864 A | * | 6/1980 | Fischer | F16K 1/165 |
| | | | | 137/601.11 |
| 4,699,317 A | | 10/1987 | Childs | |
| 4,999,167 A | * | 3/1991 | Skelley | F23J 15/04 |
| | | | | 261/138 |
| 2008/0314260 A1 | * | 12/2008 | Hardenburger | F23L 13/08 |
| | | | | 99/476 |

FOREIGN PATENT DOCUMENTS

| | | |
|---|---|---|
| CN | 205690416 U | 11/2016 |
| CN | 107449295 A | 12/2017 |
| CN | 206959070 U | 2/2018 |
| DE | 621876 C | 11/1935 |
| DE | 112014003577 T5 | 4/2016 |

OTHER PUBLICATIONS

International Search Report and Written Opinion, Application No. PCT/CN2019/105998, dated Dec. 24, 2019.
Chinese First Examination Report Notification, Oct. 2, Application No., 201910263998.7, pp. 1-24.
Chinese Notice of Allowance, Application No. 201910263998.7, dated Feb. 2, 2020.

* cited by examiner

HEAT EXCHANGE FLUE AND HEAT EXCHANGE DEVICE

TECHNICAL FIELD

The present invention relates to a heat exchange flue and a heat exchange device such as a boiler including the heat exchange flue.

BACKGROUND

In the field of heat exchange devices such as boilers, it is desired to avoid ash accumulation and/or condensation of flue gas on the heating surface (i.e., heat exchange tube bank or bundle). For this, some improvement solutions have been proposed in the prior art. For example, CN104344413B (as shown in FIG. 1) proposes to periodically reverse the flow direction of flue gas in the flue to remove the ash on the heat exchange tube.

Specifically, in the CN104344413B solution, the flue wall 1' defines the flue divided into a plurality of flue sections by a plurality of flue gas dampers 3' horizontally orientated and vertically spaced, and a heat exchange tube bank (i.e., heating surface) 2' is arranged horizontally in each flue section. The opening state of each flue gas damper 3' is adjustable (by means of the flappers 4'), thereby allowing the flue gas flow direction in the flue to be periodically reversed, to thus remove the ash on the heat exchange tube (which is usually deposited on a leeward side of the tube).

However, this solution still has some drawbacks as follows.

For example, each flue gas damper 3' extends horizontally to cross the entire flue section, as shown in FIG. 2, so that each individual flue gas damper has a big size, especially in terms of its frame (the long side may be as long as ten or twenty meters, and the short side may be as long as a few meters), which causes difficulties in the manufacture, installation, and maintenance of the flue gas damper. Moreover, the thermal expansion and contraction effect is significant, which further increases the difficulty of installation. Meanwhile, a big amount of materials (such as steel) is required to manufacture the frame, which leads to a high manufacturing cost. Most importantly, no matter how the flue gas dampers are adjusted, the flue gas must exchange heat with a part of the heating surface (that is, a part of the heat exchange tube bank). In this way, even when the temperature of the flue gas is already low, the flue gas temperature will be further reduced after the flue gas passes through the heating surface, which will easily cause condensation, produce acid rot, sticky dust and other problems which may hinder heat transfer and even block the heating surface. Additionally, when the flue gas flows along a serpentine flow path, the flue gas velocity will gradually decrease along each layer of the horizontal flue section, due to the resistance of the heat exchange tube bank used as the heating surface, which leads to undesired ash accumulation or unsatisfactory ash removal from the downstream heating surface.

Therefore, there is a need for improvement solutions.

SUMMARY OF THE INVENTION

The present invention is aimed to provide a heat exchange flue and a corresponding heat exchange device that can overcome at least one of the above-mentioned drawbacks.

It should be noted that, herein the term "heating surface" equals to "heat exchange tube bank".

According to an aspect of the present invention, there is provided a heat exchange flue comprising a top flue gas chamber, a bottom flue gas chamber and a heat exchange section located between the two chambers, the heat exchange section includes a heat exchange tube bank in the middle and a left side flue and a right side flue respectively on left and right sides of the heat exchange tube bank; wherein the top flue gas chamber is defined by the surrounding flue walls, collects upstream flue gas and allows the flue gas to flow into the left side flue and/or the right side flue, and the bottom flue gas chamber is also defined by the surrounding flue walls, collects flue gas from the left side flue and/or the right side flue, and discharges the flue gas downstream, the left and right side flues are each in a vertical box shape, defined by the surrounding flue walls and the heat exchange tube bank; the left and right side flues each have a plurality of flue gas dampers, and the flue gas dampers in each side flue are vertically spaced apart, and the flue gas dampers in the left side flue are horizontally aligned with the corresponding flue gas dampers in the right side flue, each flue gas damper has a flue gas damper frame defining a flue gas port and a flue gas port opening and closing device capable of selectively opening and closing the flue gas port; wherein each flue gas damper frame is hollow out and is horizontally arranged, and has an outer contour consistent with the cross-sectional shape of the left or right side flues, and the frame has its periphery connected to the surrounding flue walls in an airtight manner, and has its part corresponding to the heat exchange tube bank connected to a substantially horizontal flue gas shield plate in an airtight manner; the flue gas shield plate has its front and rear sides air-tightly fixed to the corresponding front and rear flue walls, and has its left and right sides air-tightly connected to the corresponding left and right side flue gas damper frame respectively, so that each layer of the left and right side flue gas dampers and the corresponding flue gas shield plate, in combination with an adjacent layer of the left and right side flue gas dampers and the corresponding flue gas shield plates, define a horizontal flue section; in the case that the heat exchange tube bank is oriented so as to intersect with the flue gas shield plate, the flue gas shield plate is formed with holes to receive the heat exchange tubes in an airtight manner.

The present invention also provides a heat exchange device including the heat exchange flue as described above. The device can be a boiler.

According to the present invention, first of all, by redesign the main flue as a "sandwich"-type structure with left and right side flues and a heating surface in the middle, and by designing the large-sized flue gas damper as small-sized flue gas dampers that are only installed in the left and right side flues, the structure and size of the flue gas damper is greatly simplified, thereby facilitating disassembly, assembly, and maintenance of the flue gas damper. Secondly, with this "sandwich"-type structure, the flue gas can directly pass the left and/or right side flue (as shown in FIG. 7), without heat exchange with the heating surface, and thus the working load adjustment range can be maximized while ensuring a desired temperature of the flue gas and preventing condensation. Further, also because of this "sandwich"-type structure, a large space is provided at both ends of each horizontal flue section corresponding to each side flue, where access openings can be provided on the flue walls to facilitate the installation and maintenance of each layer of flue gas dampers and heating surface. Additionally, each flue gas damper can be opened and closed independently, so that the flue gas flow path through the heat exchange section is diverse. Finally, according to a preferred embodiment, the heights of horizontal flue sections gradually decrease from top to bottom, so as to ensure that the flue gas flow rate does not drop or drop too much when flowing downstream, to thus ensure no ash accumulation on the low temperature section of the heating surface.

DETAILED DESCRIPTION OF PREFERRED EMBODIMENTS

Figure 3:
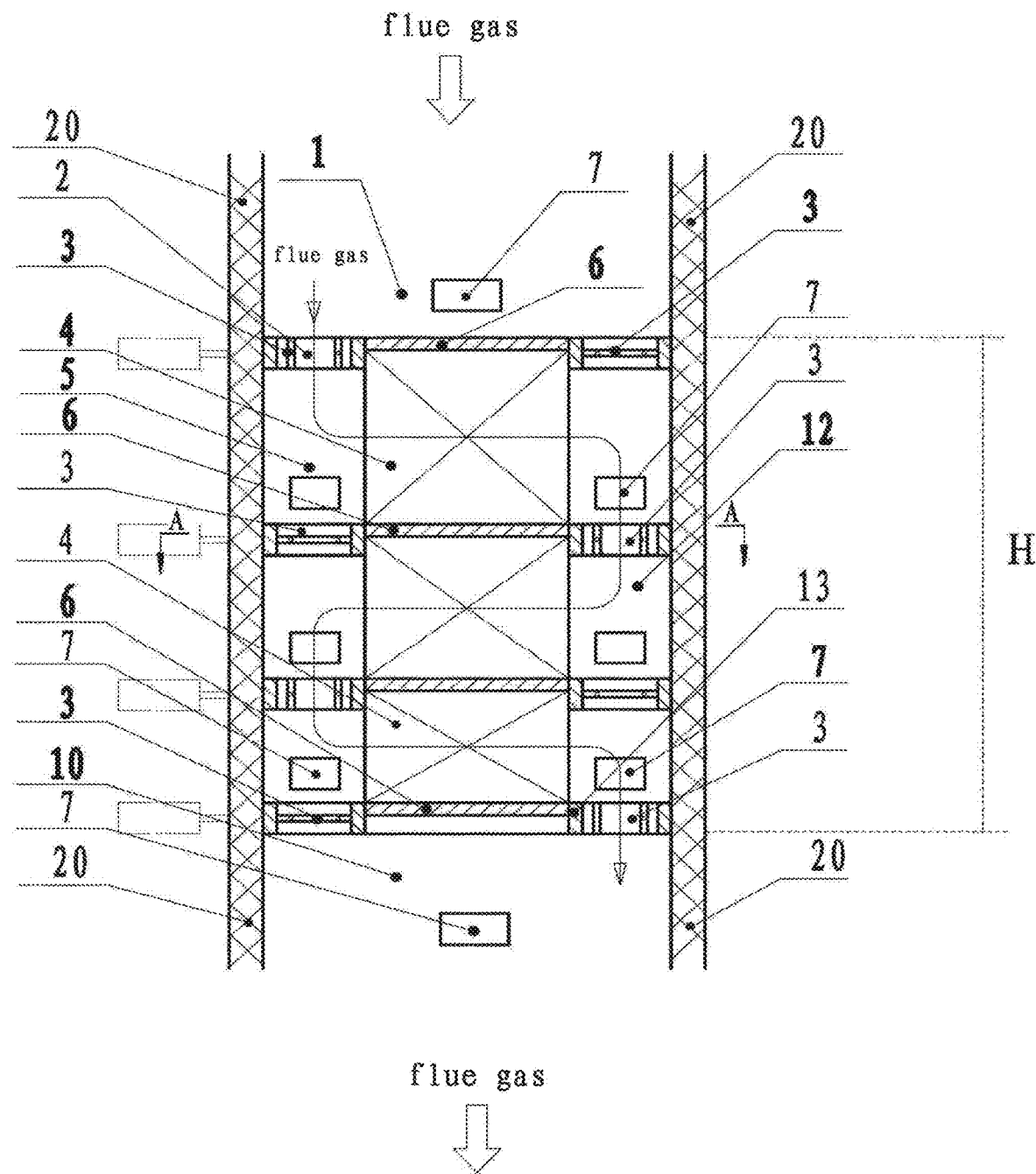
FIG. 3 is a schematic front view of an embodiment of the heat exchange flue according to the present invention.

The present invention relates to a heat exchange flue, as shown in FIG. 3, which has a top flue gas chamber 1, a bottom flue gas chamber 10 and a heat exchange section H located between the two chambers. The heat exchange section H includes a heat exchange tube bank (i.e., a heating surface) 4 in the middle, and a left side flue 5 and a right side flue 12 respectively on the left and right sides of the heat exchange tube bank 4.

The heat exchange tube bank 4 is preferably oriented vertically, that is, its axis is substantially vertical, but the bank may also be horizontally oriented with substantially extending back and forth, or oriented in any orientation between the vertical orientation and substantially front-rear horizontal orientation. The axis of the heat exchange tube bank is positioned in a vertical plane extending substantially forward and backward, thereby allowing the flue gas to wash or flush the surface of the heat exchange tube laterally.

The top flue gas chamber 1 is defined by the surrounding flue walls 20 and collects the flue gas from the upstream and allows the flue gas to flow into the left side flue 5 and/or the right side flue 12. The bottom flue gas chamber 10 is also defined by the surrounding flue walls 20 but collects the flue gas from the left side flue 5 and/or the right side flue 12 and discharges it downstream.

Figure 4:
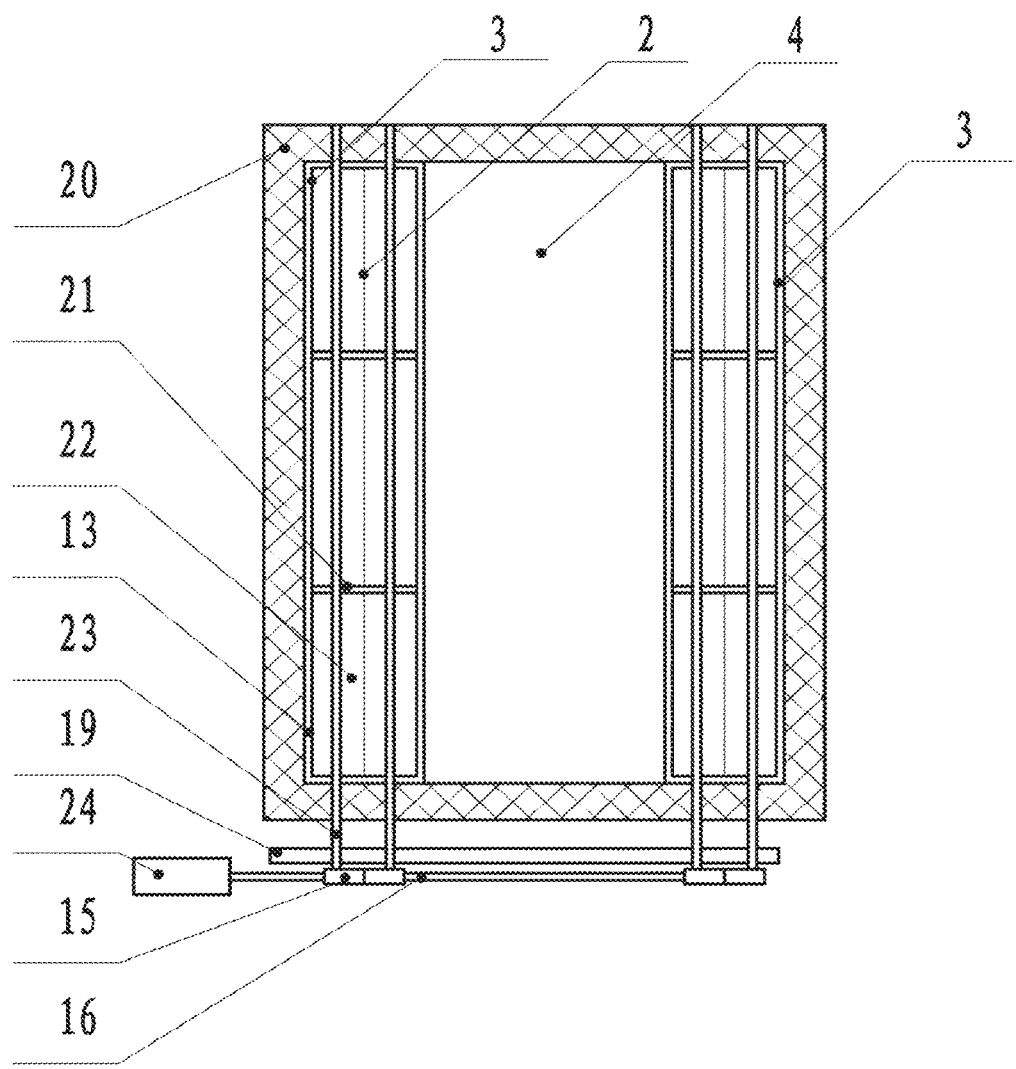
FIG. 4 is a schematic cross-sectional view of the heat exchange flue according to FIG. 3, taken along A-A, showing the flue gas damper frame and a possible flue gas port opening and closing device.

The left and right side flues 5 and 12 are respectively located on the left and right sides of the heating surface 4, and are each in a vertical box shape (for example, with a rectangular cross-section when viewed from the top as shown in FIG. 4), and are defined by the surrounding flue walls (e.g., the front flue wall, the rear flue wall, and the left/right side flue wall) and the heating surface 4.

The left and right side flues 5, 12 each have a plurality of (at least two) flue gas dampers 3, and the flue gas dampers 3 in each side flue are vertically spaced apart, and the flue gas dampers 3 in the left side flue are horizontally aligned with the corresponding flue gas dampers in the right side flue.

Each flue gas damper 3 has a flue gas damper frame 13 defining a flue gas port 2, and has a flue gas port opening and closing device capable of selectively opening and closing the flue gas port.

As shown in FIGS. 3 and 4, the flue gas damper frame 13 is hollow out and is horizontally arranged. The door frame 13 has an outer periphery consistent with the cross-sectional shape of the left/right side flues (for example, in the shape of rectangular, or other shapes), and air-tightly connected to the surrounding flue walls (for example, in case the frame is rectangular, three of its four sides are connected to the front flue wall, and the rear flue wall, and a corresponding one of the left and right side flue wall, respectively). The part of the frame corresponding to the heat exchange tube bank 4 (for example, the fourth side in case of a rectangular frame) is air-tightly connected to a substantially horizontal flue gas shield plate 6 which will be described below.

According to a possible embodiment, the flue gas shield plate 6 is a plate made of e.g., steel, formed with holes to receive the heat exchange tubes air-tightly, in the case that the shield plate intersects with the heat exchange tube bank 4 of the heating surface, for example when the tube bank is arranged vertically; or formed with no holes in the case that the shield plate does not intersects with the heat exchange tube bank of the heating surface, such as when the tube bank is arranged horizontally. The flue gas shield plates 6 has its front and rear sides air-tightly fixed to the corresponding front and rear flue walls 20, and has its left and right sides air-tightly connected to the corresponding left and right side flue gas damper frame 13 respectively. As a result, each layer of the left and right side flue gas dampers 3 and the corresponding flue gas shield plate 6, in combination with an adjacent layer of the left and right side flue gas dampers 3 and the corresponding flue gas shield plates 6, define a horizontal flue section.

The upper most flue gas shield plate 6 is formed with no holes, so that the flue gas from the top flue gas chamber 1 can only enter the left and/or right side flues through the top left side flue gas damper and/or right side flue gas damper, without directly entering the heating surface.

Figure 1:
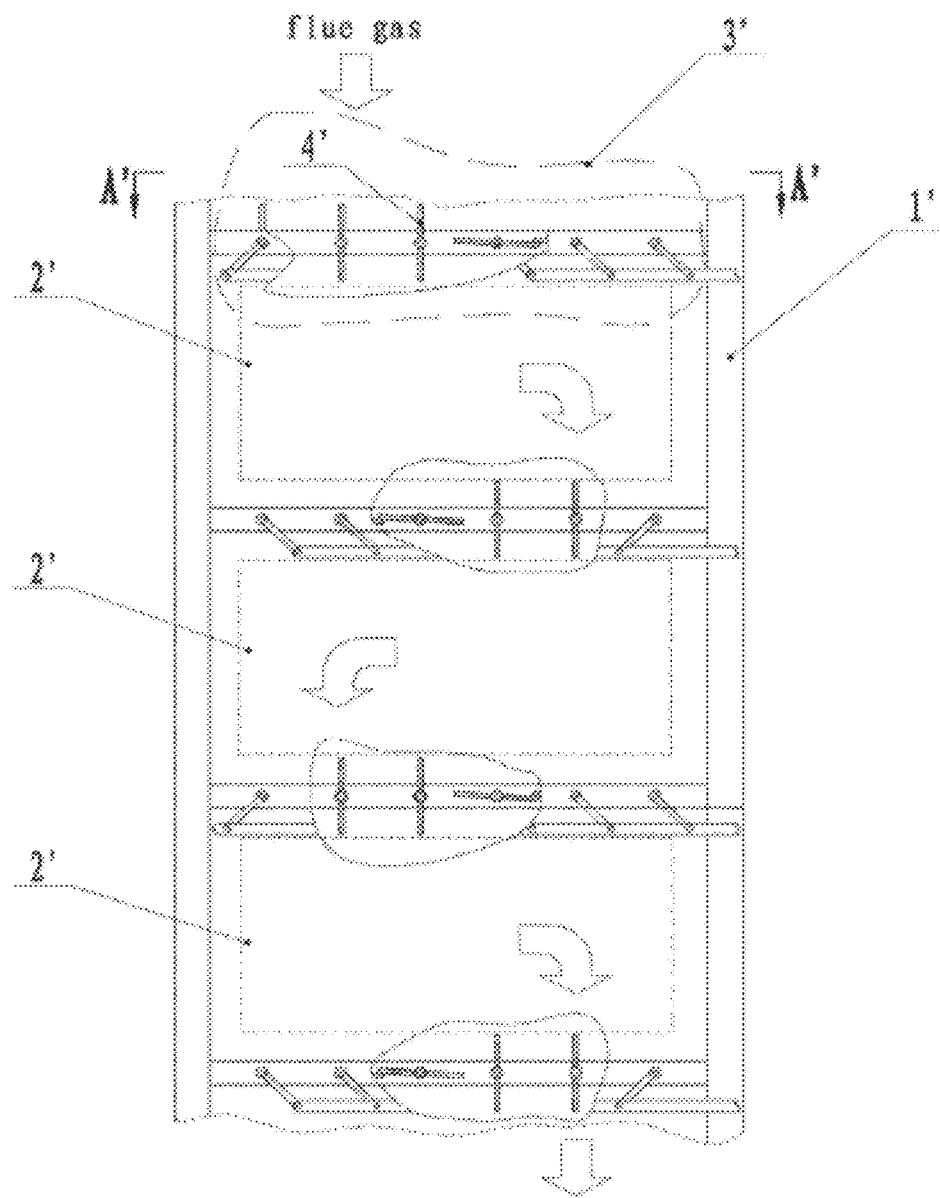
FIG. 1 is a schematic front view of a heat exchange flue according to the prior art.
Figure 2:
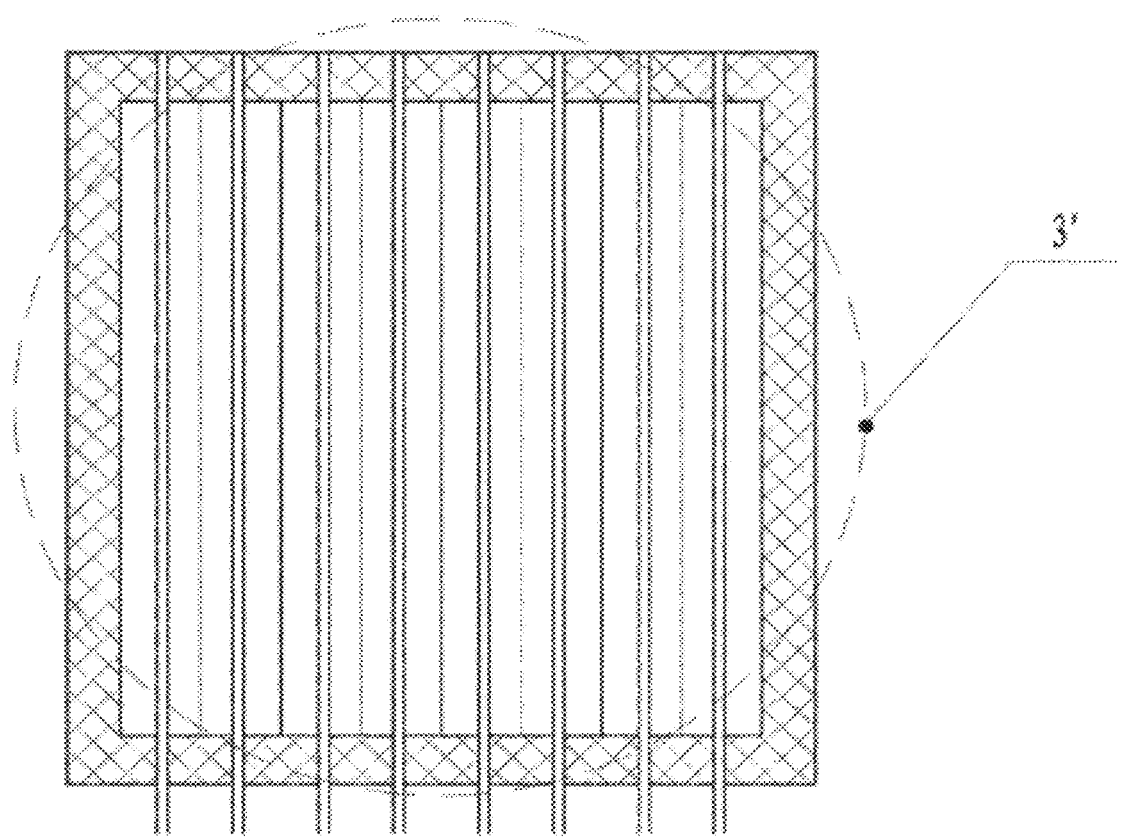
FIG. 2 is a schematic cross-sectional view taken along line A'-A' of FIG. 1, showing the flue gas damper of the heat exchange flue.

Due to the above structure of the present invention, large spaces are provided at both ends of each horizontal flue section, corresponding to the left and right side flues. Accordingly, access openings 7 can be provided in the flue walls near both ends of each horizontal flue section (as shown in FIG. 1), so as to facilitate installation, maintenance and repair by an operator. With the access openings, the operator can easily access each side flue, so as to install each layer of flue gas dampers 3 and perform maintenance to the flue gas dampers 3 and the heating surface 4.

In one embodiment, as shown in FIG. 4, each flue gas damper 3 has a flue gas port 2 (e.g., a rectangular opening as in the figure) defined by a flue gas damper frame 13, and has a corresponding flue gas port opening and closing device which includes: a rotating shaft 23; a flap member 22 fixedly connected to the rotating shaft 23 to rotate with it so as to close or open at least a part of the flue gas port; a plurality of supporting plates 21 for supporting the rotating shaft 23; and a rotating shaft driving device 24. The supporting plate 21 is in the shape of an elongated sheet, with two ends respectively fixedly connected to opposite sides of the flue gas damper frame 13.

Figure 5:
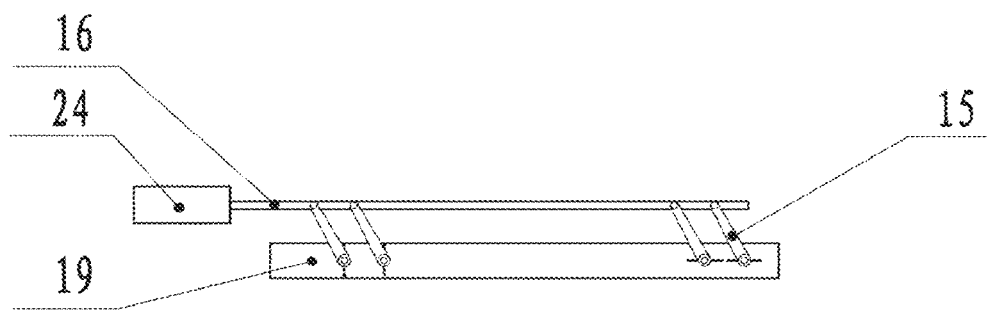
FIG. 5 shows some members of the flue gas port opening and closing device of FIG. 4.

In a more specific embodiment, as shown in FIGS. 4 and 5, the rotating shaft driving device includes: a bracket 19 stationary relative to the flue gas damper frame 13 (for example, the bracket 19 is fixed on the flue wall), and rocker arms 15 rotatably supported by the bracket 19. Each rocker arm has one end fixedly connected to the rotating shaft and the other end pivotally connected to an actuation rod 16 which is optionally connected to an actuator 24.

In use, the actuation rod 16 is moved manually (if there is no actuator 24), or by the actuator 24, to a predetermined position, thereby driving the rocker arms 15 to rotate relative to the bracket 19, and thus in turn driving the rotation shaft 23 to rotate, and then driving the flap member 22 to rotate, so as to close or open the flue gas port 2. The predetermined position can be achieved by a suitable stopper.

Those skilled in the art should understand that the rotating shaft 23 can be actuated via other actuation configurations. For example, the rotating shaft 23 can itself extend outside the flue or extend outside the flue by means of a rod connected to it, and then is connected to actuating mechanisms such as belt transmission mechanism, chain transmission mechanism, or gear transmission mechanism, so as to realize rotation.

In a further possible embodiment, each flue gas damper frame 13 has a plurality of rotating shafts 23 arranged in parallel, and these shafts 23 are interlinked with each other so that all the flap members 22 carried by these rotating shafts can be opened or closed simultaneously like a window blind. In order to close the entire flue gas port, adjacent flap members 22 abut against each other or are partially overlapped with each other.

Figure 6:
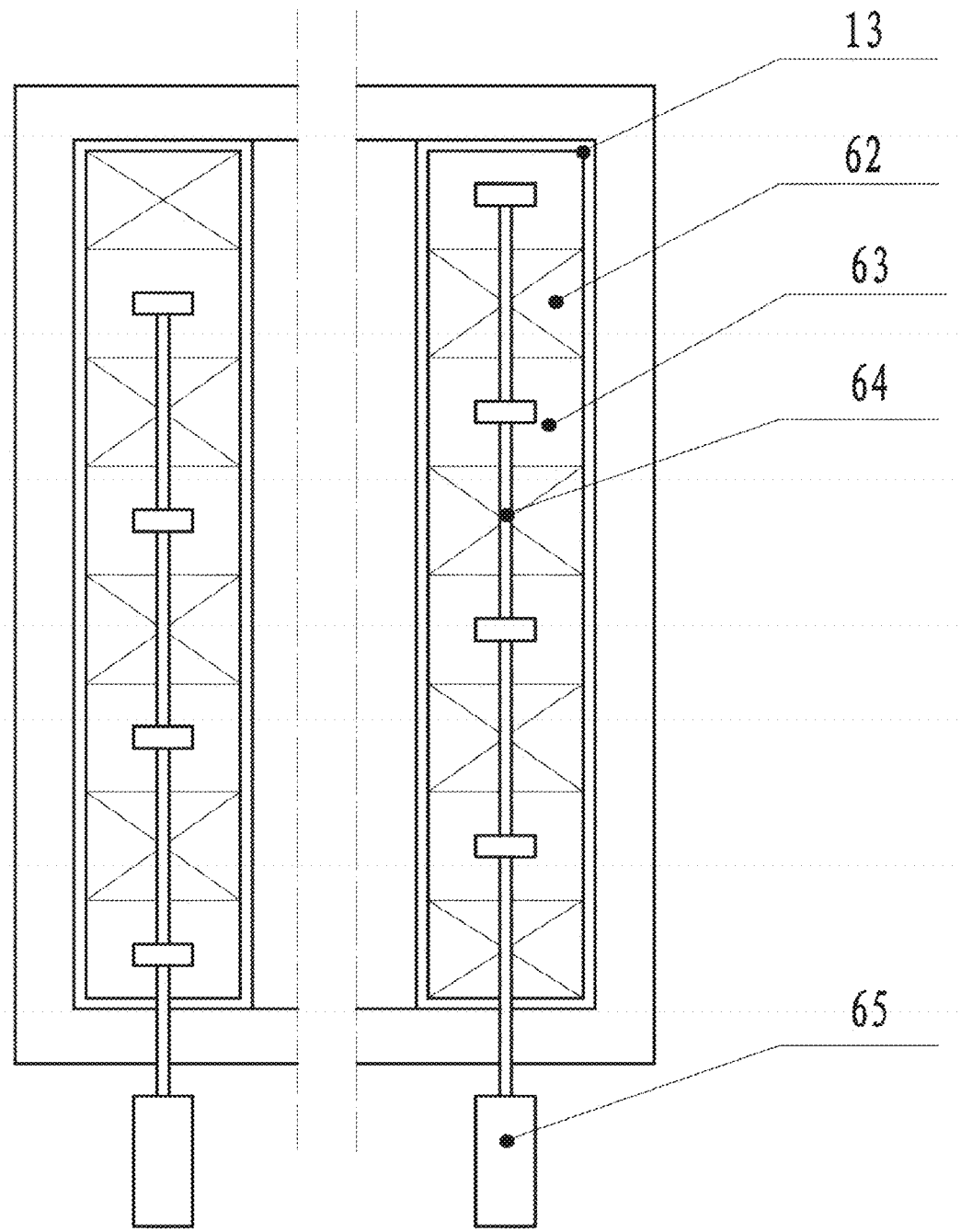
FIG. 6 shows another possible flue gas port opening and closing device.

In another embodiment, as shown in FIG. 6, each flue gas damper frame 13 has a group of stationary gates 62 spaced apart from each other, with adjacent gates defining a flue gas port. The flue gas port opening and closing device includes: a pulling rod 64; a group of sliding gates 63 fixed to the pulling rod 64 at intervals along the pulling rod; a plurality of support plates (similar to the support plate 21, not shown) for reciprocally supporting the pulling rod 64; and an actuating device 65 for driving the pulling rod to move back and forth. The stationary gates 62 and the sliding gates 63 are alternate to each other. The size of the sliding gate 63 is slightly larger than that of the flue gas port. Thus, when the pulling rod 64 is pulled to a predetermined position, the sliding gates 3 can block or open the flue gas port. The predetermined position can be achieved by a stopper.

The flue gas port opening and closing devices of the flue gas damper frames on the left and right sides can be operated in linkage or independently.

Figure 7:
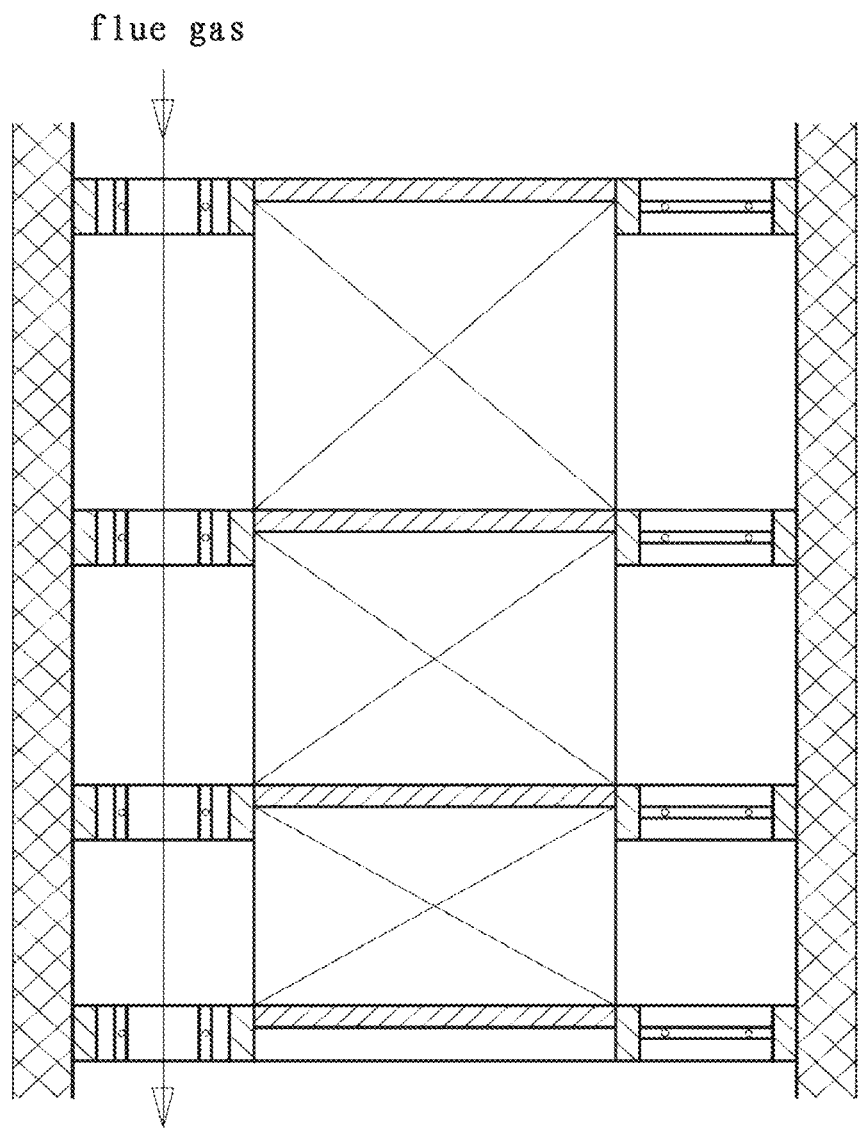
FIG. 7 shows a possible operation mode of the heat exchange flue according to the present invention.
Figure 8:
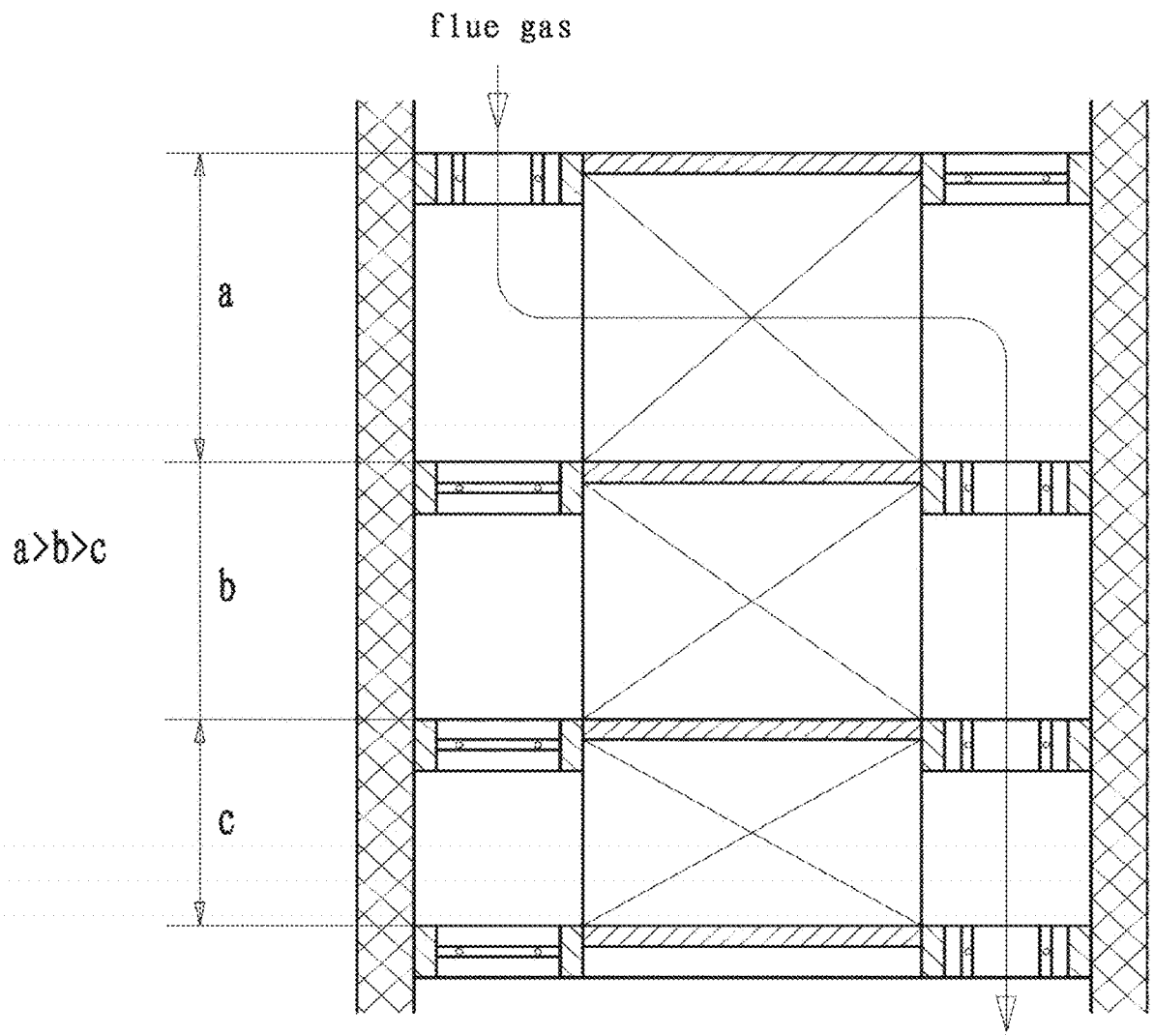
FIG. 8 shows another possible operation mode of the heat exchange flue according to the present invention.

According to the present invention, the heat exchange flue can be configured: to allow the flue gas to pass through each horizontal flue section sequentially along a serpentine path, as shown in FIG. 3; or such that all the flue gas dampers of the left side flue are in the open position and meanwhile all the flue gas dampers of the right side flue are in the closed position, and thus the flue gas does not pass through the heat exchange tube bank but directly flows through the left side flue, as shown in FIG. 7; or conversely, all the flue gas dampers of the right side flue are in the open position and meanwhile all the flue gas dampers of the left side flue are in the closed position, and thus the flue gas does not pass through the heat exchange tube bank but directly flows through the right side flue (not shown); or all the flue gas dampers are in the open position, so that the flue gas flows through the left and right side flue at the same time without passing through the heat exchange tube bank (not shown); or suitably set the opening and closing of flue gas dampers in the left and right side flues according to the working load, so that the flue gas only passes through partial horizontal flue sections, not all, as shown in FIG. 8.

According to an aspect of the present invention, in each of the left and right side flue 5, 12, the vertical distance between adjacent flue gas dampers 3 decreases from top to bottom, and accordingly the vertical heights of the horizontal flue sections decrease from top to bottom, as shown in FIGS. 3, 7, and 8 (especially see a>b>c in FIG. 8 for easy understanding, a, b, and c respectively represent the vertical heights of the respective horizontal flue sections). As a result, it is ensured that the downstream flue gas still has a relatively high speed after undergoing multiple shuttle runs through the heating surface, thereby reducing or avoiding ash accumulation on the heat exchange tube.

Finally, it should be noted that, according to the present invention, the heat exchange tube bank on the heating surface is preferably oriented vertically, so as to further avoid ash accumulation due to gravity. However, other orientations are also possible, as long as the flue gas in the horizontal flue section wipes the heat exchange tube banks laterally.

According to the present invention, first of all, by redesign the main flue as a "sandwich"-type structure with left and right side flues and a heating surface in the middle, and designing the large flue gas damper as small-sized flue gas dampers that are only installed in the left and right side flues, the structure and size of the flue gas damper is greatly simplified, thereby facilitating disassembly, assembly, and maintenance of the glue gas door. Secondly, with this "sandwich"-type structure, the flue gas can directly pass the left and/or right side flue (as shown in FIG. 7), without heat exchange with the heating surface, and thus the working load adjustment range can be maximized while ensuring a desired temperature of the flue gas and preventing the condensation. Further, also because of this "sandwich"-type structure, a large space is defined at both ends of each horizontal flue section corresponding to each side flue where access openings can be provided on the flue walls to facilitate the installation and maintenance of each layer of flue gas dampers and heating surface. Additionally, each flue gas damper can be opened and closed independently, so that the flue gas flow path through the heat exchange section is diverse. Finally, according to a preferred embodiment, the upstream horizontal flue section has a vertical height bigger than the downstream horizontal flue section, so as to ensure that the flue gas flow rate does not drop or drop too much when flowing downstream, to thus ensure no dust accumulation in the low temperature section of the heating surface.

The invention claimed is:
1. A heat exchange flue, comprising:
a top flue gas chamber, a bottom flue gas chamber, and a heat exchange section located between the two chambers, the heat exchange section comprising a heat exchange tube bank in the middle and a left side flue and a right side flue respectively on the left and right sides of the heat exchange tube bank, the left side flue and the right side flue having no heat exchange tube bank provided therein; wherein
the top flue gas chamber is defined by the surrounding flue walls, which collects upstream flue gas and allows the flue gas to flow into the left side flue and/or the right side flue, and the bottom flue gas chamber is also defined by the surrounding flue walls, which collects flue gas from the left side flue and/or the right side flue, and discharges the flue gas downstream, and the left and right side flues are each in a vertical box shape, defined by the surrounding flue walls and the heat exchange tube bank;

the left and right side flues each have a plurality of flue gas dampers, and the flue gas dampers in each side flue are vertically spaced apart, and the flue gas dampers in the left side flue are horizontally aligned with the corresponding flue gas dampers in the right side flue, each flue gas damper has a flue gas damper frame defining a flue gas port and has a flue gas port opening and closing device capable of selectively opening and closing the flue gas port; wherein each flue gas damper frame is hollowed out and is horizontally arranged, and has an outer contour consistent with the cross-sectional shape of the left or right side flues, the peripheral edges of the frame being respectively connected to the surrounding flue gas walls in an airtight manner, the part of the frame corresponding to the heat exchange tube bank being connected to a substantially horizontal flue gas shield plate in an airtight manner;

the flue gas shield plate has its front and rear sides air-tightly fixed to the corresponding front and rear flue walls, and has its left and right sides air-tightly connected to the corresponding left and right side flue gas damper frame respectively, so that each layer of the left and right side flue gas dampers and the corresponding flue gas shield plate, in combination with an adjacent layer of the left and right side flue gas dampers and the corresponding flue gas shield plates, define a horizontal flue section; and the heat exchange tube bank is oriented to intersect with, or not intersect with the flue gas shield plate.

2. The heat exchange flue according to claim 1, wherein the upper most flue gas shield plate is formed with no holes, so that the flue gas from the top flue gas chamber can only enter the left and/or right side flues through the upper most left side flue gas damper and/or the upper most right side flue gas damper, without directly entering the heat exchange tube bank.

3. The heat exchange flue according to claim 1, wherein access openings are provided in the flue walls, at both ends of each horizontal flue section, corresponding to the left and right side flues, so as to allow an operator to access each side flue.

4. The heat exchange flue according to claim 1, wherein each flue gas damper has a flue gas port defined by a flue gas damper frame, and the flue gas port opening and closing device includes: a rotating shaft, a flap member fixedly connected to the rotating shaft to rotate with it so as to close or open at least a part of the flue gas port, a plurality of supporting plates for rotatably supporting the rotating shaft; and a rotating shaft driving device.

5. The heat exchange flue according to claim 4, wherein the supporting plate is in the shape of an elongated sheet, with two ends thereof respectively fixedly connected to opposite sides of the flue gas damper frame.

6. The heat exchange flue according to claim 4, wherein the rotating shaft driving device includes: a bracket stationary relative to the flue gas damper frame; rocker arms rotatably supported by the bracket, each rocker arm having one end fixedly connected to the rotating shaft and the other end pivotally connected to an actuation rod which is connected to an actuator.

7. The heat exchange flue according to claim 4, wherein the rotating shaft itself extends outside the flue or extends outside the flue by means of a rod connected to it, and then is connected to a belt transmission mechanism or a chain transmission mechanism or a gear transmission mechanism as the rotating shaft driving device, so as to be rotatable by the mechanism.

8. The heat exchange flue according to claim 4, wherein each flue gas damper frame has a plurality of rotating shafts arranged in parallel which are interlinked with each other so that adjacent flap members can abut against each other or are partially overlapped with each other, so as to close the entire flue gas port.

9. The heat exchange flue according to claim 1, wherein each flue gas damper frame has a group of stationary gates spaced apart from each other, with adjacent gates defining the flue gas port; and the flue gas port opening and closing device includes: a pulling rod; a group of sliding gates fixed to the pulling rod at intervals along the pulling rod; a plurality of support plates for reciprocally supporting the pulling rod; and a driving device for driving the pulling rod to move back and forth; and the stationary gates and the sliding gates are alternate to each other, and each sliding gate has a size slightly larger than that of the flue gas port, so that when the pulling rod is pulled to a predetermined position, the sliding gates can block or open at least a portion of the flue gas port.

10. The heat exchange flue according to claim 1, wherein the flue gas port opening and closing devices of the flue gas damper frames are operated in linkage or independently.

11. The heat exchange flue according to claim 10, wherein the flue gas dampers can be configured:

to allow the flue gas to pass through each horizontal flue section sequentially along a serpentine path;

such that all the flue gas dampers of the left side flue are in the open position and meanwhile all the flue gas dampers of the right side flue are in the closed position, and thus the flue gas does not pass through the heat exchange tube bank but directly flows through the left side flue;

such that all the flue gas dampers of the right side flue are in the open position and meanwhile all the flue gas dampers of the left side flue are in the closed position, and thus the flue gas does not pass through the heat exchange tube bank but directly flows through the right side flue;

such that all the flue gas dampers are in the open position, so that the flue gas flows through the left and right side flue at the same time without passing through the heat exchange tube bank; and to suitably set the opening and closing of flue gas dampers in the left and right side flues, so that the flue gas only passes through partial, not all, horizontal flue sections.

12. The heat exchange flue according to claim 1, wherein vertical heights of the horizontal flue sections decreases from top to bottom.

13. The heat exchange flue according to claim 1, wherein the heat exchange tube bank is oriented so that its axis is positioned in a vertical plane extending substantially forward and backward, thereby allowing the flue gas to wash the surface of the heat exchange tube laterally.

14. A heat exchange device, comprising the heat exchange flue as set forth in claim 1.

* * * * *